US009206338B2

(12) United States Patent
Laprade

(10) Patent No.: US 9,206,338 B2
(45) **Date of Patent: *Dec. 8, 2015**

(54) HEAT-TRANSFER LABEL ASSEMBLY AND METHOD OF USING THE SAME

(75) Inventor: Jean Paul Laprade, North Smithfield, RI (US)

(73) Assignee: MULTI-COLOR CORPORATION, Batavia, OH (US)

( * ) Notice: Subject to any disclaimer, the term of this patent is extended or adjusted under 35 U.S.C. 154(b) by 248 days.

This patent is subject to a terminal disclaimer.

(21) Appl. No.: 13/595,514

(22) Filed: Aug. 27, 2012

(65) Prior Publication Data

US 2013/0071634 A1 Mar. 21, 2013

Related U.S. Application Data

(63) Continuation-in-part of application No. 11/644,803, filed on Dec. 22, 2006, now Pat. No. 8,252,400, which is a continuation of application No. 10/067,685, filed on Feb. 4, 2002, now abandoned.

(60) Provisional application No. 60/349,134, filed on Jan. 16, 2002.

(51) Int. Cl.
*B32B 9/00* (2006.01)
*B32B 7/12* (2006.01)
(Continued)

(52) U.S. Cl.
CPC ............. *C09J 7/0203* (2013.01); *B44C 1/1712* (2013.01); *B44F 1/06* (2013.01); *B65C 1/00* (2013.01); *B65C 3/00* (2013.01); *C09D 11/10* (2013.01); *Y10T 428/24843* (2015.01)

(58) Field of Classification Search
CPC ........ B41M 5/025; B44C 1/1712; B44F 1/06; C09D 11/10
USPC ................................ 428/40.1, 343, 352, 354
See application file for complete search history.

(56) References Cited

U.S. PATENT DOCUMENTS 3,616,015 A 10/1971 Kingston
3,907,974 A 9/1975 Smith
(Continued)

FOREIGN PATENT DOCUMENTS

EP 0819726 A2 1/1998
WO 0103950 A1 1/2001

OTHER PUBLICATIONS

ViTEL 2000-3000 Technical Guide, Shell Chemical Company, Akron, Ohio, published before Feb. 4, 2002.
(Continued)

*Primary Examiner* — Victor Chang
(74) *Attorney, Agent, or Firm* — Kriegsman & Kriegsman

(57) ABSTRACT

A heat-transfer label assembly and method of using the same. In one embodiment, the assembly is well-suited for decorating refillable glass articles and includes a support portion, a wax skim coat, and a transfer portion. The support portion may include a carrier web overcoated with a polyethylene layer. The wax skim coat may overcoat the polyethylene layer. The transfer portion may include a protective lacquer, an ink design, and a heat-activatable adhesive. The protective lacquer may be printed directly on the skim coat and may include a cross-linked phenoxy resin. The ink design may be printed onto the protective lacquer and may include a binder, a colorant, and a cross-linking system. The adhesive, which may differ from the ink design only by lacking colorant, may be printed onto the ink design, any exposed portions of the protective lacquer, and the surrounding skim coat.

25 Claims, 1 Drawing Sheet

(51) Int. Cl.

| | |
|---|---|
| ***C09J 7/02*** | (2006.01) |
| ***B65C 1/00*** | (2006.01) |
| ***B65C 3/00*** | (2006.01) |
| ***B44C 1/17*** | (2006.01) |
| ***B44F 1/06*** | (2006.01) |
| ***C09D 11/10*** | (2014.01) |

(56) References Cited

U.S. PATENT DOCUMENTS

| | | | |
|---|---|---|---|
| 4,321,185 | A | 3/1982 | Benitez |
| 4,548,857 | A | 10/1985 | Galante |
| 4,555,436 | A | 11/1985 | Geurtsen et al. |
| 4,927,709 | A | 5/1990 | Parker et al. |
| 4,935,300 | A | 6/1990 | Parker et al. |
| 5,448,282 | A | 9/1995 | Imai et al. |
| 5,607,896 | A | 3/1997 | Hutt |
| 5,800,656 | A | 9/1998 | Geurtsen et al. |
| 5,891,520 | A | 4/1999 | Makar et al. |
| 5,968,689 | A | 10/1999 | Torikoshi et al. |
| 6,004,419 | A | 12/1999 | Torii |
| 6,033,763 | A | 3/2000 | Laprade et al. |
| 6,042,676 | A | 3/2000 | Stein |
| 6,083,620 | A | 7/2000 | LaPrade et al. |
| 6,096,408 | A | 8/2000 | Laprade et al. |
| 6,099,944 | A | 8/2000 | Laprade et al. |
| 6,376,069 | B1 | 4/2002 | Bilodeau et al. |
| 6,391,415 | B1 | 5/2002 | McCurry et al. |
| 6,537,651 | B2 | 3/2003 | Geurtsen et al. |
| 6,902,641 | B1 | 6/2005 | Patel et al. |
| 8,252,400 | B2 | 8/2012 | Laprade |

OTHER PUBLICATIONS

Technical literature for Cytec High Solids Amino Crosslinking Agents, Cytec Industries, Inc., West Paterson, NJ, published before Feb. 4, 2002.

Technical Literature for UCAR Solution Vinyl Resins for Coatings, Union Carbide, Danbury, CT, published before Feb. 4, 2002.

Technical Literature for NACURE & K-CURE acid and blocked acid catalysts, King Industries, Norwalk, CT, published before Feb. 4, 2002.

Product document of Cymel 385 by Cytec Industries, Inc.

Derwent Abstract of JP 01166991A.

HEAT-TRANSFER LABEL ASSEMBLY AND METHOD OF USING THE SAME

CROSS-REFERENCE TO RELATED APPLICATIONS

The present application is a continuation-in-part of U.S. patent application Ser. No. 11/644,803, inventor Jean Paul Laprade, filed Dec. 22, 2006, which, in turn, is a continuation of U.S. patent application Ser. No. 10/067,685, inventor Jean Paul Laprade, filed Feb. 4, 2002, which, in turn, claims the benefit under 35 U.S.C. 119(e) of U.S. Provisional Patent Application Ser. No. 60/349,134, filed Jan. 16, 2002, the disclosures of all of which are incorporated herein by reference.

BACKGROUND OF THE INVENTION

The present invention relates generally to heat-transfer label assemblies and more particularly to a novel heat-transfer label assembly and to a method of using the same.

Heat-transfer labels are implements commonly used to decorate and/or to label commercial articles, such as, and without limitation to, containers for beverages (including alcoholic beverages, such as beer), essential oils, detergents, adverse chemicals, as well as health and beauty aids. As can readily be appreciated, heat-transfer labels are desirably resistant to abrasion and chemical effects in order to avoid a loss of label information and desirably possess good adhesion to the articles to which they are affixed. Heat-transfer labels are typically constructed as part of a heat-transfer label assembly, with one or more heat-transfer labels printed on a removable carrier web.

One of the earliest types of heat-transfer label assemblies is described in U.S. Pat. No. 3,616,015, inventor Kingston, which issued October, 1971, and which is incorporated herein by reference. In the aforementioned patent, there is disclosed a heat-transfer label assembly adapted for labeling plastic objects, the heat-transfer label assembly comprising a paper sheet or web, a wax release layer affixed to the paper sheet, and an ink design layer printed on the wax release layer. In the heat-transfer labeling process, the label-carrying web is subjected to heat, and the label is pressed onto a plastic article with the ink design layer making direct contact with the plastic article. As the paper sheet is subjected to heat, the wax layer begins to melt. This enables the paper sheet to be released from the ink design layer, with a portion of the wax layer being transferred with the ink design layer onto the plastic article and with a portion of the wax layer remaining with the paper sheet. After transfer of the design to the plastic article, the paper sheet is immediately removed, leaving the design firmly affixed to the plastic article and the wax transferred therewith exposed to the environment. The wax layer is thus intended to serve two purposes: (1) to provide release of the ink design from the web upon application of heat to the web and (2) to form a protective layer over the transferred ink design. After transfer of the label to the article, the transferred wax release layer is typically subjected to a post-flaming or post-heating technique which involves subjecting the transferred wax release layer to jets of high temperature gas either as direct gas flames or as hot air jets to produce wax surface temperatures of about 300° F. to 400° F. for a period of time sufficient to remelt the transferred wax. This remelting of the transferred wax is performed to enhance the optical clarity of the wax protective layer (thereby enabling the ink design layer therebeneath to be better observed) and to enhance the protective properties of the transferred wax release.

Unfortunately, despite the aforementioned post-flaming step, the transferred wax layer is often perceptible on clear and/or dark-colored objects.

Consequently, a great deal of effort has been expended in replacing or obviating the need for a wax release layer. One type of heat-transfer label assembly that does not include a wax release layer is exemplified by U.S. Pat. No. 4,935,300, inventors Parker et al., which issued Jun. 19, 1990, and which is incorporated herein by reference. In the aforementioned Parker patent, the label assembly, which is said to be particularly well-suited for use on high density polyethylene, polypropylene, polystyrene, polyvinylchloride and polyethylene terephthalate surfaces or containers, comprises a paper carrier web which is overcoated with a layer of thermoplastic polyethylene. A protective lacquer layer comprising a polyester resin and a relatively small amount of a nondrying oil is printed onto the polyethylene layer. An ink design layer comprising a resinous binder base selected from the group consisting of polyvinylchloride, acrylics, polyamides and nitrocellulose is then printed onto the protective lacquer layer. A heat-activatable adhesive layer comprising a thermoplastic polyamide adhesive is then printed onto the ink design layer.

Although the above-described Parker label assembly substantially reduces the wax-related effects discussed previously, said label assembly does not quite possess the same release characteristics of heat-transfer label assemblies containing a wax release layer. In fact, when put to commercial use, the polyethylene release layer of the Parker label assembly was found to become adhesive when subjected to the types of elevated temperatures typically encountered during label transfer. Accordingly, another type of heat-transfer label assembly differs from the Parker heat-transfer label assembly in that a very thin layer or "skim coat" of carnauba wax is interposed between the polyethylene release layer and the protective lacquer layer to improve the release of the protective lacquer from the polyethylene-coated carrier web. The thickness of the skim coat corresponds to approximately 0.1-0.4 lbs. of the wax spread onto about 3000 square feet of the polyethylene release layer. The aforementioned "skim coat-containing" heat-transfer label assembly also differs from the Parker label assembly in that the heat-activatable adhesive of the "skim coat" label assembly is printed over the entirety of the ink and protective lacquer layers, with the peripheral edges of the adhesive layer in direct contact with the wax skim coat.

An example of a "skim coat-containing" heat-transfer label assembly of the type described above is disclosed in U.S. Pat. No. 6,099,944, inventors Laprade et al., which issued Aug. 8, 2000, and which is incorporated herein by reference. According to the aforementioned patent, a label assembly is provided that is designed for use in decorating clear glass articles in such a way as to give such articles the appearance of having been frosted. In a preferred embodiment, the label includes (a) a support portion in the form of a sheet of paper overcoated with a release layer of polyethylene, (b) a skim coat of wax overcoated onto the polyethylene release layer and (c) a transfer portion, the transfer portion including a protective lacquer layer printed onto the skim coat, an ink layer printed onto the protective lacquer layer, and an adhesive layer printed onto the ink layer, as well as onto any exposed portions of the underlying protective lacquer layer and onto a surrounding area of the skim coat. The protective lacquer layer comprises a solvent-soluble phenoxy resin that has been cross-linked by a melamine resin. The ink layer comprises a design printed with a frosted ink, the frosted ink preferably comprising a solvent-soluble phenoxy resin, a silica and a colorant. The adhesive layer comprises a phenoxy resin of the type present in a water-based phenoxy resin dispersion.

Examples of other "skim coat-containing" heat-transfer label assemblies are disclosed in the following U.S. patents, all of which are incorporated herein by reference: U.S. Pat. No. 5,800,656, inventors Geurtsen et al., issued Sep. 1, 1998; U.S. Pat. No. 6,096,408, inventors Laprade et al., issued Aug. 1, 2000; U.S. Pat. No. 6,033,763, inventors Laprade et al., issued Mar. 7, 2000; and U.S. Pat. No. 6,083,620, inventors Laprade et al., issued Jul. 4, 2000.

When using a "skim coat-containing" heat-transfer label assembly of the type described above to decorate an article, one typically preheats the article and the label assembly prior to decoration. More specifically, where the article is made of glass, the article is typically preheated to a temperature of about 300° F. In addition, a silane adhesion promoter is also typically applied to the glass article prior to preheating. Decoration is typically performed by applying heat to the bottom of the carrier while the top of the label is pressed against the article. Once the transferred portion of the heat-transfer label assembly has been applied to the article, the labeled article is then typically subjected to a post-heating step so that the protective lacquer layer and/or the adhesive layer, one or both of which typically comprise thermosetting resins, may be cured. (By contrast, the ink layer of the above-described heat-transfer label assembly does not include a thermosetting resin.) Said post-heating step is typically performed by conveying the labeled articles through one or more industrial ovens to heat the articles to an elevated temperature, such as about 400° F. to about 425° F., for a particular amount of time, typically 15-20 minutes.

In certain instances, it may be desirable to re-use a container that has been labeled with a heat-transfer label. For example, it may be desirable, for environmental or financial reasons, for a labeled container holding a consumable item, such as a beverage or a health or beauty product, to be returned to the manufacturer of the consumable item after the consumable item has been consumed so that the container may be refilled with the consumable item and then re-sold. However, as can readily be appreciated, such a reusing of the labeled container requires that the labeled container be cleaned satisfactorily prior to being refilled with the consumable item. In many cases, particularly where the container is a glass container, such a cleaning typically involves a caustic wash conducted at elevated temperatures. One difficulty with cleaning the container in the aforementioned fashion, however, is that such a cleaning process typically causes chemical damage to the label as a result of the caustic wash. In addition, the label may also become damaged during washing and/or refilling through abrasion effects due to contact between two or more containers or between a container and the washing and/or filling equipment. Moreover, such chemical and/or abrasive damage may be exacerbated if the container is re-used not merely once but a number of times.

Therefore, there is a clear need for a heat-transfer label that can be applied to a container and that exhibits sufficient chemical and abrasion resistance to withstand one or more caustic washing and/or refilling cycles.

SUMMARY OF THE INVENTION

It is an object of the present invention to provide a novel heat-transfer label assembly.

It is another object of the present invention to provide a heat-transfer label assembly as described above that overcomes at least some of the problems associated with existing heat-transfer label assemblies of the type described above, such as the need for the label, after application to an object, such as a container, to exhibit sufficient chemical and abrasion resistance to withstand one or more caustic washing and/or refilling cycles.

In furtherance of the above and other objects to be set forth or to become apparent from the description to follow, and according to one aspect of the invention, there is provided a heat-transfer label assembly, said heat-transfer label assembly comprising (a) a support portion; and (b) a transfer portion over the support portion for transfer of the transfer portion to an article upon application of heat to the support portion while the transfer portion is placed in contact with the article, the transfer portion comprising (i) a protective lacquer, the protective lacquer being over the support portion and comprising a cross-linked phenoxy resin; (ii) an ink design, the ink design being over at least a portion of the protective lacquer, the ink design comprising a binder, a colorant and a cross-linking system, the binder comprising at least one copolyester resin and a vinyl chloride/vinyl acetate resin, the cross-linking system comprising (A) a cross-linking resin for cross-linking the binder, the cross-linking resin comprising a melamine-formaldehyde resin and (B) a heat-activatable catalyst, the heat-activatable catalyst comprising an amine-blocked sulfonic acid catalyst; and (iii) a heat-activatable adhesive, the heat-activatable adhesive being over the ink design, the heat-activatable adhesive comprising a cross-linked resin.

According to a further aspect of the invention, the heat-transfer label assembly may further comprise a wax skim coat, the wax skim coat being interposed between the support portion and the transfer portion.

According to a further aspect of the invention, the protective lacquer of the heat-transfer label may consist of a single protective lacquer layer.

According to a further aspect of the invention, the cross-linked phenoxy resin of the protective lacquer may be made by cross-linking a phenoxy resin having the following chemical structure:

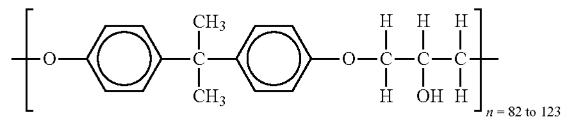

According to a further aspect of the invention, the phenoxy resin of the protective lacquer, prior to cross-linking, may have a solution viscosity of 4500 to 7000 mPa·s(cP) at 40% solids, by weight, in methyl ethyl ketone.

According to a further aspect of the invention, the phenoxy resin of the protective lacquer may be cross-linked using a melamine-formaldehyde resin.

According to a further aspect of the invention, the melamine-formaldehyde resin of the protective lacquer may be a partially methylated melamine-formaldehyde resin.

According to a further aspect of the invention, the partially methylated melamine-formaldehyde resin of the protective lacquer may constitute no more than about 5%, by weight, of the protective lacquer.

According to a further aspect of the invention, the ink design may be in direct contact with the protective lacquer.

According to a further aspect of the invention, the at least one copolyester resin of the ink design may comprise a first copolyester resin and a second copolyester resin, wherein the first copolyester resin may have a tensile strength of 7000 psi and a 4% elongation and wherein the second copolyester resin may have a tensile strength of 8000 psi and a 7% elongation.

According to a further aspect of the invention, the vinyl chloride/vinyl acetate resin of the ink design may have a composition of approximately 90 percent vinyl chloride, 4 percent vinyl acetate, with a hydroxyl content of approximately 2.3 percent.

According to a further aspect of the invention, the first copolyester resin of the ink design may constitute about 47%, by weight, of the binder, the second copolyester resin of the ink design may constitute about 47%, by weight, of the binder, and the vinyl chloride/vinyl acetate resin may constitute about 5%, by weight, of the binder.

According to a further aspect of the invention, the vinyl chloride/vinyl acetate resin of the ink design may constitute up to about 25%, by weight, of the binder.

According to a further aspect of the invention, the colorant of the ink design may be a pigment, the pigment being present in an amount ranging from about 50% to about 200%, by weight, of the total of the binder and the cross-linking system.

According to a further aspect of the invention, the cross-linking resin of the ink design may be present in an amount constituting about 5% to about 10%, by weight, of the binder.

According to a further aspect of the invention, the heat-activatable adhesive may be in direct contact with the ink design.

According to a further aspect of the invention, the heat-activatable adhesive may be in direct contact with the ink design, any exposed areas of the protective lacquer, and a surrounding area of the wax skim coat.

According to a further aspect of the invention, the heat-activatable adhesive layer may differ from the ink design only by lacking any colorant.

According to a further aspect of the invention, the support portion may comprise a carrier, the carrier consisting of a polymeric film overcoated with a release coating made of a non-wax, non-silicone, thermoset release material, wherein the carrier may be made of a non-wax material that separates cleanly from the transfer portion with no visually discernible portion of the carrier being transferred to the article along with the transfer portion.

According to another aspect of the invention, there is provided a heat-transfer label assembly, the heat-transfer label assembly comprising (a) a support portion; and (b) a transfer portion over the support portion for transfer of the transfer portion to an article upon application of heat to the support portion while the transfer portion is placed in contact with the article, the transfer portion comprising (i) an ink design, the ink design being over the support portion; and (ii) a heat-activatable adhesive, the heat-activatable adhesive being over the ink design, the heat-activable adhesive comprising a binder and a cross-linking system, the binder comprising a copolyester resin and a vinyl chloride/vinyl acetate resin, the cross-linking system comprising (A) a cross-linking resin for cross-linking the binder, the cross-linking resin comprising a melamine-formaldehyde resin and (B) a heat-activatable catalyst for catalyzing the cross-linking within about 1-2 minutes after the transfer portion has been transferred to an article that has been pre-heated, prior to label transfer, to a temperature of about 250° F.-325° F., the heat-activatable catalyst comprising an amine-blocked sulfonic acid catalyst.

According to a further aspect of the invention, the ink design may differ in composition from the heat-activatable adhesive only in that the ink design may further comprise a colorant.

According to a further aspect of the invention, the heat-transfer label assembly may further comprise a wax skim coat, the wax skim coat being interposed between the support portion and the transfer portion.

According to a further aspect of the invention, the heat-transfer label assembly may further comprise a protective lacquer interposed between the support portion and the ink design.

According to another aspect of the invention, there is provided a method of treating a glass container, the method comprising the steps of (a) providing a glass container; (b) transferring the transfer portion of the heat-transfer label assembly of claim 1 to the glass container, whereby the glass container is labeled; (c) subjecting the labeled glass container to at least one caustic wash, whereby the transfer portion resists chemical degradation.

According to a further aspect of the invention, the subjecting step may comprise subjecting the labeled glass container to up to 30 caustic washes, whereby the transfer portion resists chemical degradation.

For purposes of the present specification and claims, it is to be understood that certain terms used herein, such as "on" or "over," when used to denote the relative positions of two or more layers of a heat-transfer label, are primarily used to denote such relative positions in the context of how those layers are situated prior to transfer of the transfer portion of the label to an article since, after transfer, the arrangement of layers is inverted as those layers which were furthest removed from the associated support sheet are now closest to the labelled article.

Additional objects, as well as features, advantages and aspects of the present invention, will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate preferred embodiments of the invention and, together with the description, serve to explain the principles of the invention. In the drawings wherein like reference numerals represent like parts.

DETAILED DESCRIPTION OF PREFERRED EMBODIMENTS

Figure 1:
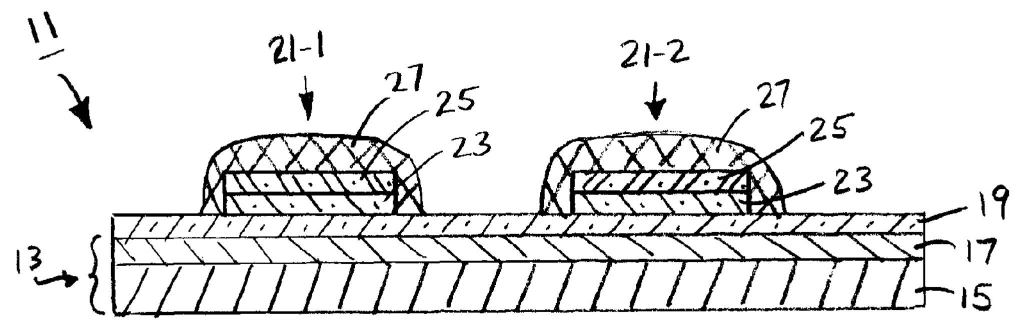
FIG. 1 is a schematic section view of a first embodiment of a heat-transfer label assembly constructed according to the teachings of the present invention.

Referring now to FIG. 1, there is shown a schematic section view of a first embodiment of a heat-transfer label assembly, said heat-transfer label assembly being represented generally by reference numeral 11.

Assembly 11 may comprise a support portion 13. Support portion 13, in turn, may comprise a carrier web 15 overcoated with a polyethylene layer 17. Carrier web 15 may be made of paper or a similarly suitable substance. Details of polyethylene layer 17 are disclosed in U.S. Pat. Nos. 4,935,300 and 4,927,709, the disclosures of which are incorporated herein by reference.

Assembly 11 also may comprise a wax skim coat 19 of the type described above, skim coat 19 being coated directly on top of the entirety of polyethylene layer 17. During label transfer, a portion of skim coat 19 may be transferred along with the label onto the article being decorated, and a portion of skim coat 19 may remain on top of polyethylene layer 17.

Assembly 11 may further comprise a plurality of spaced-apart transfer portions 21-1 and 21-2 (it being understood that, although two transfer portions 21-1 and 21-2 are shown in the present embodiment, assembly 11 could be modified to include as few as one such transfer portion or as many as three or more such transfer portions). Transfer portions 21-1 and 21-2 may be positioned directly on top of skim coat 19 for transfer of one or both of transfer portions 21-1 and 21-2, under appropriate conditions of heat and pressure, from carrier 13 to one or more suitable articles, such as one or more glass containers. It is to be understood that, although, in the present embodiment, transfer portions 21-1 and 21-2 are identical, transfer portions 21-1 and 21-2 need not be identical.

In the present embodiment, each of transfer portions 21-1 and 21-2 may comprise (i) a protective lacquer 23 printed directly on top of a portion of skim coat 19, (ii) an ink design 25 printed onto a desired area of protective lacquer 23, and (iii) a heat-activatable adhesive 27 printed onto ink design 25, any exposed portions of protective lacquer 23, and a surrounding portion of skim coat 19.

Protective lacquer 23 may consist of a single continuous or discontinuous protective lacquer layer or may comprise two or more such protective lacquer layers arranged in a partially or completely overlapping stack. For illustrative purposes, protective lacquer 23 is shown in the present embodiment as a single continuous layer. One or more of the layers making up protective lacquer 23 may comprise a cross-linked resin. Examples of the cross-linked resin may include one or more cross-linked phenoxy resins and/or one or more cross-linked polyester resins. Examples of phenoxy resins suitable for use in the aforementioned cross-linked phenoxy resin may include the UCAR® phenoxy resins (Union Carbide Corporation, Hackensack, N.J.), which have the following chemical structure:

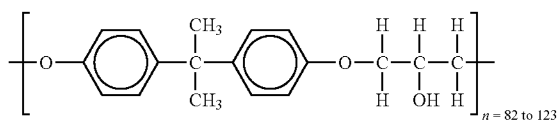

A particularly preferred UCAR® phenoxy resin may be PKHH, a medium weight grade of the above structure which, at 40% solids, by weight, in methyl ethyl ketone (MEK), has a solution viscosity of 4500 to 7000 mPa·s(cP). Examples of a suitable cross-linker for cross-linking the aforementioned phenoxy resin may include partially methylated melamine-formaldehyde resins of the type present in the CYMEL 300 series of partially methylated melamine-formaldehyde resin solutions (Cytec Industries, Inc., West Paterson, N.J.) and, in particular, CYMEL 370 partially methylated melamine-formaldehyde resin solution (88±2% nonvolatiles, iBuOH solvent). Preferably, the solids of the aforementioned CYMEL 370 resin solution constitute no more than about 5%, by weight, of protective lacquer 23 (with the remainder of protective lacquer 23 being the aforementioned phenoxy resin) since amounts of CYMEL 370 in excess thereof tend to cause protective lacquer 23 to adhere undesirably to support portion 13 during label transfer.

One advantage to using a cross-linker of the aforementioned melamine-formaldehyde type, as opposed to other types of cross-linkers, is that said cross-linker does not require the use of a catalyst, but rather, is heat-activatable and that the heat-activation thereof can be achieved during the routine "post-curing" step (i.e., a heating of the labeled container at about 400° F. to about 425° F. for about 15-20 minutes) to which the labeled container would ordinarily be subjected anyway following label transfer. It should be noted, however, that the present invention is not limited to such heat-activatable cross-linkers.

To form protective lacquer 23, a lacquer composition that may comprise the above-identified phenoxy resin, a suitable cross-linker, and one or more suitable volatile solvents may be deposited onto a desired area of skim coat 19, preferably by gravure printing or a similar technique. After deposition of the lacquer composition onto the desired area of skim coat 19, the volatile solvent(s) evaporate(s), leaving only the non-volatile components thereof to make up protective lacquer 23. In a preferred embodiment, the aforementioned lacquer composition comprises about 20%, by weight, PKHH; about 1%, by weight, CYMEL 370 resin solution; about 59%, by weight, methyl ethyl ketone; and about 20%, by weight, toluene. Protective lacquer 23 may have a thickness of about 1.5 microns.

Ink design 25 may consist of a single continuous or discontinuous ink layer or may comprise two or more such ink layers arranged in a partially or completely overlapping stack. For illustrative purposes, ink design 25 is shown in the present embodiment as a single continuous layer. Ink design 25 may be printed directly onto protective lacquer 23. Each of said one or more ink layers of ink design 25 may be formed by depositing, preferably by gravure printing, one or more ink compositions of the type to be described below and, thereafter, allowing the volatile solvent(s) of the one or more ink compositions to evaporate, leaving only the non-volatile components of the one or more ink compositions to form ink design 25. Ink design 25 may have a thickness of about 1.5 microns for colored inks and about 2.0 microns for white ink.

Each of the one or more ink compositions of the present invention may consist of or comprise (i) a resinous binder; (ii) a cross-linking system adapted to effect cross-linking of the resinous binder; (iii) a colorant; and (iv) one or more suitable volatile solvents.

More specifically, said resinous binder may consist of or comprise one or more resins of the type commonly used in heat-transfer label inks including, but not limited to, polyester resins, polyester/vinyl resins, polyamide resins, phenoxy resins, epoxy resins, polyketone resins, and acrylic resins. Examples of preferred resins may include ViTEL® 2700 (Shell Chemical Company, Akron, Ohio), a copolyester resin having a high tensile strength (7000 psi) and a low elongation (4% elongation), and ViTEL® 2300 (Shell Chemical Company), another copolyester resin having a high tensile strength (8000 psi) and a low elongation (7% elongation).

A vinyl chloride/vinyl acetate resinous binder may be added to the aforementioned binder(s) in an amount constituting up to about 25%, by weight, of the total binder, to impart gloss to the labeled product. An example of a preferred vinyl chloride/vinyl acetate resin may be VAGH (Union Carbide), a high molecular weight, partially-hydrolyzed vinyl chloride/vinyl acetate resin having a composition of approximately 90 percent vinyl chloride, 4 percent vinyl acetate, with a hydroxyl content of approximately 2.3 percent.

The cross-linking system of the subject ink composition may consist of or comprise (i) a cross-linking resin for cross-linking the resinous binder and (ii) a heat-activatable catalyst for catalyzing the cross-linking of the cross-linker to the resinous binder within about 1-2 minutes after transfer of the label portion to an article heated to a temperature in the range of about 250° F.-325° F., preferably about 275° F.-325° F. Examples of suitable cross-linking resins may include partially methylated melamine-formaldehyde resins of the type present in the CYMEL 300 series of partially methylated melamine-formaldehyde resin solutions (Cytec Industries, Inc., West Paterson, N.J.) and, in particular, CYMEL 370 partially methylated melamine-formaldehyde resin solution (88±2% nonvolatiles, iBuOH solvent). Such a cross-linker may be present in the ink composition in an amount constituting about 5%-10%, by weight, of the total binder. An example of a suitable catalyst may be an amine-blocked sulfonic acid catalyst, such as Nacure® 1323 blocked catalyst (King Industries, Norwalk, Conn.). Such a catalyst may be present in the ink composition in an amount constituting about 0.01% to 1%, by weight, of the total binder.

The colorant may consist of a single colorant or may comprise a combination of colorants. The colorant may be a pigment and may be present in the ink composition in an amount representing about 50% to 200%, by weight, of the other non-volatile components of the formulation. Where the pigment is titanium dioxide, the relative proportion of colorant to the other non-volatile components may be about 2:1, by weight, respectively; for pigments other than titanium dioxide, the relative proportion of colorant to the other non-volatile components may be about 1:2, respectively.

The one or more volatile solvents may be volatile solvents of the type commonly used in heat-transfer label inks and may be, for example, a mixture of methyl ethyl ketone (MEK) and toluene. For example, said MEK/toluene mixture may be a 1:1 mixture and may be present in the ink composition in an amount constituting about 40%-75%, by weight, of the total ink composition. The particular proportion of solvent(s) to non-volatile components may be dependent upon the viscosity requirements for printing, with the objective typically being to maximize the percentage of non-volatiles (and, therefore, viscosity) while still achieving good print quality.

Illustrative ink formulations for use in making ink design 25 are as follows:

| | % By Weight |
|---|---|
| Formulation No. 1 (White) | |
| Titanium dioxide | 16.67 |
| ViTEL ® 2700 copolyester resin | 3.75 |
| ViTEL ® 2300 copolyester resin | 3.75 |
| VAGH vinyl chloride/vinyl acetate resin | 0.42 |
| Cymel 370 melamine-formaldehyde resin | 0.42 |
| Nacure 1323 amine-blocked sulfonic acid catalyst | 0.024 |
| MEK | 37.5 |
| Toluene | 37.5 |
| Formulation No. 2 (Non-white) | |
| Non-white pigment | 8.33 |
| ViTEL ® 2700 copolyester resin | 7.5 |
| ViTEL ® 2300 copolyester resin | 7.5 |
| VAGH vinyl chloride/vinyl acetate resin | 0.83 |
| Cymel 370 melamine-formaldehyde resin | 0.83 |
| Nacure 1323 amine-blocked sulfonic acid catalyst | 0.047 |
| MEK | 37.5 |
| Toluene | 37.5 |

Adhesive 27 may consist of a single continuous or discontinuous adhesive layer or may comprise two or more such adhesive layers arranged in a partially or completely overlapping stack. For illustrative purposes, adhesive 27 is shown in the present embodiment as a single continuous layer. Adhesive 27 may be printed directly onto ink design 25, exposed portions of protective lacquer 23, and a surrounding area of skim coat 19. Each of said one or more adhesive layers of adhesive 27 may be formed by depositing, preferably by gravure printing, one or more adhesive compositions of the type to be described below and, thereafter, allowing the volatile solvent(s) of the one or more adhesive compositions to evaporate, leaving only the non-volatile components of the one or more adhesive compositions to form adhesive 27. Adhesive layer 27 may have a thickness of about 1.5 microns.

Adhesive 27 may comprise a cross-linked resin. More specifically, adhesive 27 may be identical in composition to ink design 25, except that adhesive 27 may lack the colorant(s) present in ink design 25. Accordingly, each of the one or more adhesive compositions of the present invention may consist of or comprise (i) a resinous binder; (ii) a cross-linking system; and (iii) one or more suitable volatile solvents.

More specifically, said resinous binder may be selected from the group including, but not limited to, polyester resins, polyester/vinyl resins, polyamide resins, phenoxy resins, epoxy resins, polyketone resins, and acrylic resins. Examples of preferred resins may include ViTEL® 2700 (Shell Chemical Company, Akron, Ohio), a copolyester resin having a high tensile strength (7000 psi) and a low elongation (4% elongation), and ViTEL® 2300 (Shell Chemical Company), another copolyester resin having a high tensile strength (8000 psi) and a low elongation (7% elongation).

A vinyl chloride/vinyl acetate resinous binder may be added to the aforementioned binder(s) in an amount constituting up to about 25%, by weight, of the total binder, to impart gloss to the labeled product. An example of a preferred vinyl chloride/vinyl acetate resin may be VAGH (Union Carbide), a high molecular weight, partially-hydrolyzed vinyl chloride/vinyl acetate resin having a composition of approximately 90 percent vinyl chloride, 4 percent vinyl acetate, with a hydroxyl content of approximately 2.3 percent.

The cross-linking system of the subject adhesive composition may consist of or comprise (i) a cross-linking resin for cross-linking the resinous binder and (ii) a heat-activatable catalyst for catalyzing the cross-linking of the cross-linker to the resinous binder within about 1-2 minutes after transfer of the transfer portion to an article heated to a temperature in the range of about 250° F. to about 325° F., preferably about 275° F. to about 325° F. Examples of suitable cross-linking resins may include partially methylated melamine-formaldehyde resins of the type present in the CYMEL 300 series of partially methylated melamine-formaldehyde resin solutions (Cytec Industries, Inc., West Paterson, N.J.) and, in particular, CYMEL 370 partially methylated melamine-formaldehyde resin solution (88±2% nonvolatiles, iBuOH solvent). Such a cross-linker may be present in the adhesive composition in an amount constituting about 5% to about 10%, by weight, of the total binder. An example of a suitable catalyst may be an amine-blocked sulfonic acid catalyst, such as Nacure® 1323 blocked catalyst (King Industries, Norwalk, Conn.). Such a catalyst may be present in the adhesive composition in an amount constituting about 0.01% to 1%, by weight, of the total binder.

The one or more volatile solvents may be volatile solvents of the type commonly used in heat-transfer label adhesive compositions and may be, for example, a mixture of methyl ethyl ketone (MEK) and toluene. For example, said MEK/ toluene mixture may be a 1:1 mixture and may be present in the adhesive composition in an amount constituting about 40%-75%, by weight, of the total adhesive composition. The particular proportion of solvent(s) to non-volatile components may be dependent upon the viscosity requirements for printing, with the objective typically being to maximize the percentage of non-volatiles (and, therefore, viscosity) while still achieving good print quality.

Assembly 11 is particularly well-suited for use in decorating glass articles, such as glass containers. In use, such glass articles may be treated, prior to labeling, with a silane adhesion promoter of the type described in U.S. Pat. No. 3,907,974, inventor Smith, which issued Sep. 23, 1975, and which is incorporated herein by reference. The silane-treated glass articles may then be pre-heated in a conventional manner to a temperature of about 250° F.-325° F., preferably about 275° F.-325° F. While at said temperature, the silane-treated glass articles may then be decorated by bringing one or more of transfer portions 21-1 and 21-2 into direct contact therewith while sufficient heat (about 300 to 450° F.) may be applied to the bottom of carrier 13 to cause skim coat 19 to soften sufficiently to release transfer portions 21-1 and/or 21-2 from carrier 13 and to cause transfer portions 21-1 and/or 21-2 to become tacky. Within a very short time after transfer of transfer portions 21-1 and/or 21-2 onto the glass article, both ink design 25 and adhesive 27 may cure due to the heat-activation of the cross-linking system therewithin. Thereafter, during the post-heating step, protective lacquer 23 may cure due to the heat-activation of the cross-linking system therewithin.

The above-described decoration of an article using assembly 11 may be performed using conventional heat-transfer machinery (e.g., conventional cascading unit for applying silane adhesion promoter to the glass article, conventional preheating unit for heating the glass article to about 250° F.-325° F., and conventional turret assembly for applying label to article from web), and the above-described post-heating step may be performed using conventional post-heating ovens by heating, for example, at about 400° F. for about 20 minutes.

One advantageous feature resulting from using assembly 11 to decorate a glass article is that the decorated glass article exhibits improved chemical and abrasion resistance for withstanding one or more caustic washing and/or refilling cycles. More specifically, glass articles decorated using assembly 11 preferably are able to withstand up to 30 cycles of a caustic wash, thereby demonstrating chemical resistance of the label, and up to 30 cycles of a line simulation, thereby demonstrating abrasion resistance of the label. The caustic wash may involve, for example, washing the article in a bath containing a 2.25% caustic solution, wherein the wash solution is heated to a temperature of about 65° C.-70° C., and wherein the wash lasts for about 7 minutes.

Figure 2:
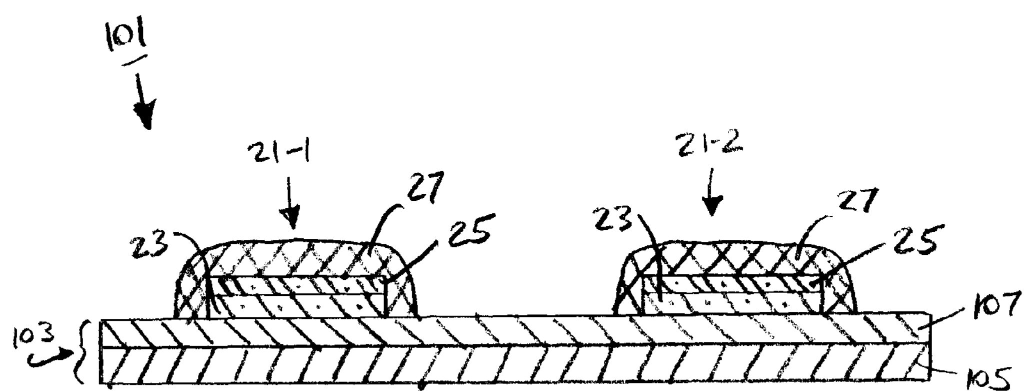
FIG. 2 is a schematic section view of second embodiment of a heat-transfer label assembly constructed according to the teachings of the present invention.

Referring now to FIG. 2, there is shown a schematic section view of a second embodiment of a heat-transfer label assembly constructed according to the teachings of the present invention, said heat-transfer label assembly being represented generally by reference numeral 101.

Assembly 101 may be similar in many respects to assembly 11, the principal difference between the two assemblies being that assembly 101 may comprise a carrier 103, instead of carrier 13, and may not comprise a skim coat 19. Carrier 103 may comprise a polymeric substrate 105 and a release coating 107 deposited on top of polymeric substrate 105. Substrate 105 may be a polymeric film selected from the group consisting of polyesters, such as polyethylene terephthalate, polyethylene napthylene; polyolefins, such as polyethylene and polypropylene; and polyamides.

More preferably, substrate 105 may be a clear plastic film of the type described above. As can readily be appreciated, one benefit to using a clear material as substrate 105 is that, if desired, one can inspect the quality of the printed matter of the label by looking at said printed matter through substrate 105 (from which perspective said printed matter appears as it will on the labeled article), as opposed to looking at said printed matter through the adhesive layer of the label (from which perspective said printed matter appears as the mirror image of what will appear on the labeled article).

A particularly preferred plastic material for use as substrate 105 may be a clear polyester film, such as a clear polyethylene terephthalate (PET) film. This is because, at least as compared to some other plastic materials like polyethylene and polypropylene, polyester is a strong plastic material and makes a good substrate to be printed onto. In addition, unlike polyethylene, polyester does not tend to soften and become tacky at the types of temperatures typically encountered during heat-transfer. Substrate 105 may have a thickness of about 1-2 mil.

Coating 107 may be applied directly on top of substrate 105. Coating 107 may be a thermoset release material that separates cleanly from label 21 and is not transferred, to any visually discernible degree, with label 21 onto an article being labeled. (For purposes of the present specification and claims, the term "visually discernible" is to be construed in terms of an unaided or naked human eye.) Release coating 107 may be clear for the same types of reasons given above in connection with substrate 105.

Coating 107 does not contain any waxes or any silicones, except to the limited extent provided below, and the terms "non-wax" and "non-silicone," when used in the present specification and claims to describe and to define the present release layer or coating, are defined herein to exclude from said release layer or coating the presence of any and all waxes and silicones not encompassed by the limited exceptions provided below or described in published PCT Application No. WO 01/03950, published Jan. 18, 2001, the disclosure of which is incorporated herein by reference.

Coating 107 may have a thickness of about 0.01 to 10 microns, more preferably about 0.02 to 1 micron, even more preferably about 0.1 micron. In addition, coating 107 may have a total surface energy of about 25 to 35 mN/m (preferably about 30 mN/m), of which about 0.1 to 4 mN/m (preferably about 1.3 mN/m) may be polar surface energy. Furthermore, when analyzed by XPS (X-ray photoelectron spectroscopy), coating 107 may have a carbon content (by atomic %) of about 90 to 99.9% (preferably about 97%) and an oxygen content (by atomic %) of about 0.1 to 10% (preferably about 3%). Accordingly, coating 107 may be predominantly a hydrocarbon in its chemical makeup.

An example of a coated polymer film suitable for use as carrier 103 of the present invention may be available from DuPont Corp. (Wilmington, Del.) as product number 140AXM 701 (140 gauge coated polyester film). Other coated polymer films which may be used as carrier 103 are described in European Patent Application No. 819,726, published Jan. 21, 1998, which document is incorporated herein by reference. The aforementioned European patent application teaches a coated film structure preferably comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and (ii) a primer coating comprising:

(A) functionalized α-olefin containing copolymers, preferably acid functionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc. and (B) crosslinking agents selected from the group consisting of amino formaldehyde resins, polyvalent metal salts, isocyanates, blocked isocyanates, epoxy resins and polyfunctional aziridines;

(iii) wherein said primer coating is applied as a primer to the polymeric film surface, preferably in its amorphous or semi-oriented state and reacted with newly generated polymeric film surfaces formed during uniaxial or biaxial stretching and heat setting.

Although the above-described polymeric film surface may be formed of a polyester, a polyolefin, or a polyamide, it may be formed form any material capable of being formed into a sheet or film. The polymeric film surface should be capable of binding or reacting with an acid-functionalized α-olefin copolymer to form a modified film base.

The above-mentioned polymer films can be manufactured by an extrusion process, such as a cast film or blown film process. In a cast film process, the polymer resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum. Alternatively, the extrudate can be blown in a conventional blown film process. Regardless of the process, however, the polyester sheet is preferably uniaxially or biaxially (preferably biaxially) stretched in the direction of film travel (machine direction) and/or perpendicular to the machine direction (traverse direction), while being heated to a temperature in the range of from about 80° C. to 160° C., preferably about 90° C. to 110° C., the degree of stretching may range from 3.0 to 5.0 times the original cast sheet unit dimension, preferably from about 3.2 to about 4.2 times the original cast sheet dimension. Reaction with the newly generated polymer film surfaces formed during stretching preferably occurs at temperatures about 130° C. or higher.

Additives such as coating aids, wetting aids such as surfactants (including silicone surfactants), slip additives, antistatic agents can be incorporated into the primer coating in levels from 0 to 50% based on the total weight of additive-free coating solids.

In another embodiment (not shown), a paper substrate, such as paper substrate 15, may be applied to the bottom of carrier 103.

The embodiments of the present invention recited herein are intended to be merely exemplary and those skilled in the art will be able to make numerous variations and modifications to it without departing from the spirit of the present invention. For example, it should be appreciated that one may add, either directly or through trans-layer migration, trace or non-functional minor amounts of waxes or silicones to the release layer described herein as "non-wax" and "non-silicone" without being outside the scope of applicants' invention. Thus, the terms "non-wax" and "non-silicone" as used herein is intended to embrace this possibility. All such variations and modifications are intended to be within the scope of the present invention as defined by the claims appended hereto.

What is claimed is:

1. A heat-transfer label assembly, said heat-transfer label assembly comprising:

(a) a support portion; and (b) a transfer portion over said support portion for transfer of the transfer portion to an article upon application of heat to the support portion while the transfer portion is placed in contact with the article, said transfer portion comprising (i) a protective lacquer, said protective lacquer being over said support portion and comprising a cross-linked phenoxy resin;

(ii) an ink design, said ink design being over at least a portion of said protective lacquer, said ink design comprising a binder, a colorant and a cross-linking system, said binder comprising at least one copolyester resin and a vinyl chloride/vinyl acetate resin, said cross-linking system comprising (A) a cross-linking resin for cross-linking said binder, said cross-linking resin comprising a melamine-formaldehyde resin and (B) a heat-activatable catalyst, said heat-activatable catalyst comprising an amine-blocked sulfonic acid catalyst; and (iii) a heat-activatable adhesive, said heat-activatable adhesive being over said ink design, said heat-activatable adhesive comprising a cross-linked resin.

2. The heat-transfer label assembly as claimed in claim 1 further comprising a wax skim coat, said wax skim coat being interposed between said support portion and said transfer portion.

3. The heat-transfer label assembly as claimed in claim 1 wherein said protective lacquer consists of a single protective lacquer layer.

4. The heat-transfer label assembly as claimed in claim 1 wherein said cross-linked phenoxy resin is made by cross-linking a phenoxy resin having the following chemical structure:

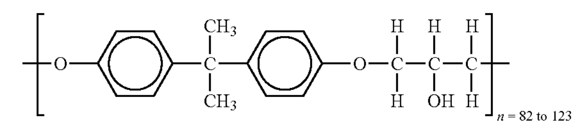

5. The heat-transfer label assembly as claimed in claim 4 wherein said phenoxy resin, prior to cross-linking, has a solution viscosity of 4500 to 7000 mPa·s(cP) at 40% solids, by weight, in methyl ethyl ketone.

6. The heat-transfer label assembly as claimed in claim 4 wherein said phenoxy resin is cross-linked using a melamine-formaldehyde resin.

7. The heat-transfer label assembly as claimed in claim 6 wherein said melamine-formaldehyde resin is a partially methylated melamine-formaldehyde resin.

8. The heat-transfer label assembly as claimed in claim 7 wherein said partially methylated melamine-formaldehyde resin constitutes no more than about 5%, by weight, of said protective lacquer.

9. The heat-transfer label assembly as claimed in claim 1 wherein said ink design is in direct contact with the protective lacquer.

10. The heat-transfer label assembly as claimed in claim 1 wherein said at least one copolyester resin comprises a first copolyester resin and a second copolyester resin, wherein said first copolyester resin has a tensile strength of 7000 psi and a 4% elongation and wherein said second copolyester resin has a tensile strength of 8000 psi and a 7% elongation.

11. The heat-transfer label assembly as claimed in claim 10 wherein said vinyl chloride/vinyl acetate resin has a composition of approximately 90 percent vinyl chloride, 4 percent vinyl acetate, with a hydroxyl content of approximately 2.3 percent.

12. The heat-transfer label assembly as claimed in claim 11 wherein said first copolyester resin constitutes about 47%, by weight, of said binder, wherein said second copolyester resin constitutes about 47%, by weight, of said binder, and wherein said vinyl chloride/vinyl acetate resin constitutes about 5%, by weight, of said binder.

13. The heat-transfer label assembly as claimed in claim 1 wherein said vinyl chloride/vinyl acetate resin constitutes up to about 25%, by weight, of said binder.

14. The heat-transfer label assembly as claimed in claim 1 wherein said colorant is a pigment, said pigment being present in an amount ranging from about 50% to about 200%, by weight, of the total of said binder and said cross-linking system.

15. The heat-transfer label assembly as claimed in claim 1 wherein said cross-linking resin is present in an amount constituting about 5% to about 10%, by weight, of said binder.

16. The heat-transfer label assembly as claimed in claim 1 wherein said heat-activatable adhesive is in direct contact with said ink design.

17. The heat-transfer label assembly as claimed in claim 2 wherein said heat-activatable adhesive is in direct contact with said ink design, any exposed areas of said protective lacquer, and a surrounding area of said wax skim coat.

18. The heat-transfer label assembly as claimed in claim 1 wherein said heat-activatable adhesive layer differs from said ink design only by lacking any colorant.

19. The heat-transfer label assembly as claimed in claim 1, wherein said support portion comprises a carrier, said carrier consisting of a polymeric film overcoated with a release coating made of a non-wax, non-silicone, thermoset release material, wherein said carrier is made of a non-wax material that separates cleanly from said transfer portion with no visually discernible portion of said carrier being transferred to the article along with said transfer portion.

20. A heat-transfer label assembly, said heat-transfer label assembly comprising:

(a) a support portion; and (b) a transfer portion over said support portion for transfer of the transfer portion to an article upon application of heat to the support portion while the transfer portion is placed in contact with the article, said transfer portion comprising (i) an ink design, said ink design being over said support portion; and (ii) a heat-activatable adhesive, said heat-activatable adhesive being over said ink design, said heat-activable adhesive comprising a binder and a cross-linking system, said binder comprising a copolyester resin and a vinyl chloride/vinyl acetate resin, said cross-linking system comprising (A) a cross-linking resin for cross-linking said binder, said cross-linking resin comprising a melamine-formaldehyde resin and (B) a heat-activatable catalyst for catalyzing said cross-linking within about 1-2 minutes after said transfer portion has been transferred to an article that has been pre-heated, prior to label transfer, to a temperature of about 250° F.-325° F., said heat-activatable catalyst comprising an amine-blocked sulfonic acid catalyst.

21. The heat-transfer label assembly as claimed in claim 20 wherein said ink design differs in composition from said heat-activatable adhesive only in that said ink design further comprises a colorant.

22. The heat-transfer label assembly as claimed in claim 20 further comprising a wax skim coat, said wax skim coat being interposed between said support portion and said transfer portion.

23. The heat-transfer label assembly as claimed in claim 20 further comprising a protective lacquer interposed between said support portion and said ink design.

24. A method of treating a glass container, said method comprising the steps of:

(a) providing a glass container;

(b) transferring the transfer portion of the heat-transfer label assembly of claim 1 to the glass container, whereby the glass container is labeled;

(c) subjecting the labeled glass container to at least one caustic wash, whereby the transfer portion resists chemical degradation.

25. The method as claimed in claim 24 wherein said subjecting step comprises subjecting the labeled glass container to up to 30 caustic washes, whereby the transfer portion resists chemical degradation.

* * * * *